(12) United States Patent
Byng (10) Patent No.: US 8,597,122 B2
(45) Date of Patent: *Dec. 3, 2013

(54) PASSWORD ENTRY SYSTEM

(71) Applicant: Aristocrat Technologies Australia Pty Limited, North Ryde (AU)

(72) Inventor: Stephen Byng, Lane Cove (AU)

(73) Assignee: Aristocrat Technologies Australia Pty Ltd (AU)

( * ) Notice: Subject to any disclaimer, the term of this patent is extended or adjusted under 35 U.S.C. 154(b) by 0 days.

This patent is subject to a terminal disclaimer.

(21) Appl. No.: 13/630,921

(22) Filed: Sep. 28, 2012

(65) Prior Publication Data

US 2013/0084974 A1    Apr. 4, 2013

Related U.S. Application Data

(63) Continuation of application No. 11/913,917, filed as application No. PCT/AU2006/000728 on May 30, 2006, now Pat. No. 8,287,375.

(30) Foreign Application Priority Data

May 31, 2005   (AU) ................................ 2005902802

(51) Int. Cl.
    A63F 13/00    (2006.01)
(52) U.S. Cl.
    USPC ............................................. 463/37; 463/29

(58) Field of Classification Search
    USPC .................... 463/25–37; 726/19; 380/44
    See application file for complete search history.

(56) References Cited

U.S. PATENT DOCUMENTS

| | | | | |
|---|---|---|---|---|
| 4,752,068 A | * | 6/1988 | Endo | 463/15 |
| 4,858,930 A | * | 8/1989 | Sato | 463/23 |
| 5,547,202 A | * | 8/1996 | Tsumura | 463/29 |
| 5,559,961 A | * | 9/1996 | Blonder | 726/18 |
| 5,724,425 A | * | 3/1998 | Chang et al. | 705/52 |
| 6,950,949 B1 | * | 9/2005 | Gilchrist | 726/19 |
| 7,582,012 B2 | * | 9/2009 | Walker et al. | 463/17 |
| 2004/0010721 A1 | * | 1/2004 | Kirovski et al. | 713/202 |
| 2004/0034801 A1 | * | 2/2004 | Jaeger | 713/202 |
| 2004/0098584 A1 | * | 5/2004 | Sherman et al. | 713/168 |
| 2004/0127277 A1 | * | 7/2004 | Walker et al. | 463/16 |
| 2004/0139331 A1 | * | 7/2004 | Sanai et al. | 713/184 |
| 2004/0230843 A1 | * | 11/2004 | Jansen | 713/202 |
| 2005/0075158 A1 | * | 4/2005 | Walker et al. | 463/16 |
| 2006/0206918 A1 | * | 9/2006 | McLean | 726/2 |

* cited by examiner

*Primary Examiner* — Masud Ahmed (74) *Attorney, Agent, or Firm* — McAndrews, Held & Malloy, Ltd.

(57) ABSTRACT

The present invention relates to gaming apparatus (100) and methods (300) applicable to gaming apparatuses and systems. In particular a password entry method (300) and system (600) for authenticating a player's identity is disclosed in which a user's password can be defined using a set of elements (402) including a plurality of images (404) such as symbols or pictures.

18 Claims, 6 Drawing Sheets

PASSWORD ENTRY SYSTEM

This application is a continuation of U.S. patent application Ser. No. 11/913,917, filed on Mar. 27, 2008, which claims priority to PCT Patent Application No. PCT/AU06/00728, having a filing date of May 30, 2006, entitled "Password Entry System," which is hereby incorporated by reference herein in its entirety.

FIELD OF THE INVENTION

Background of the Invention

With the increase of gambling at gaming venues has come increased competition between gaming venues to obtain a larger share of the total gambling spend. Gaming venue operators have therefore continuously looked for new variations and types of games in order to attract both new and return customers to their venues.

In response to this need, suppliers of gaming devices and systems have attempted to provide the sought after variety, while still developing games that comply with the relevant regulations in the jurisdiction of the gaming venue operator. Suppliers of gaming devices therefore are faced with restrictions on the types of games and gaming apparatus that are allowable, both in terms of the prevailing regulations and in terms of providing a return on investment to the gaming venue operators.

In addition, it is important that a player be able to understand the operation of a game quickly so that the player promptly feels that they are in control of game play and can therefore extract maximum entertainment from the game.

Gaming apparatus and gaming systems are known which have player tracking systems. Some player tracking systems are configured to allow players to identify themselves by entering an alphanumeric password (and sometimes a username), either alone or in order to authenticate a player identification token, to establish the player's identity. For instance, in some gaming systems a player can establish and operate a financial account from which wagers are made or credits transferred to a gaming apparatus. These systems are typically configured such that a player must enter a password to prove that the player is indeed who the player claims to be, prior to allowing access to the player's financial account.

In another example, a password may be used by a player to lock a apparatus that he or she is playing during a period in which the apparatus is unattended, for example during a toilet or smoking break. On return to the apparatus the player uses his or her password or PIN to "unlock" the gaming apparatus.

It has been found that, for convenience, players often choose short passwords or passwords that are easy for them to remember, such as their name, the name of a family member, or simply the word "password". As a result of players' desire for convenient, easy to remember passwords, password authentication methods can be defeated relatively easily, either by trial and error or guesswork.

Any reference in this specification to the prior art does not constitute an admission that such prior art was well known or forms part of the common general knowledge in any jurisdiction.

SUMMARY OF THE INVENTION

The inventor has determined that people may be encouraged to use longer and hence more secure passwords if they are able to use images alone, or in combination with alphanumeric characters in forming a password.

Accordingly in a first aspect the present invention provides a method of operating a gaming apparatus configured to provide player access to one or more gaming apparatus features, said method comprising:
(a) receiving at least a player password defined using password elements selected from a set of elements including one or more images;
(b) determining whether the received password is valid; and
(c) providing player access to at least one gaming apparatus feature in the event that the received password is valid.

Preferably the one or more images are game-related images associated with a gaming apparatus feature accessible from the gaming apparatus. The set of elements can also include one or more characters. In a preferred embodiment the characters are selected from a character set including one or more of the following kinds of characters:
alphabetic characters;
numerals;
punctuation marks;
typographical symbols.

In use, the gaming apparatus preferably provides player access to one or more gaming apparatus features by way of at least one player interface including one or more game-related images, and wherein said set of elements includes at least one of said game-related images.

The set of elements can include one or more icons representing a game-related image which forms part of said at least one player interface.

In a preferred embodiment the set of elements includes one or more images selected from at least one of the following classes of images:
images representing the rank and/or suit of playing cards,
images representing one or more symbols used on a reel of a spinning reel game accessible on the gaming apparatus;
images representing one or more symbols used in association with a game accessible via another gaming apparatus;
images representing animated characters;
images associated with a theme of the gaming apparatus.

The method can also include, receiving a player name. In this case, step (b) can include determining whether the received password corresponds to password associated with the received player name.

Step (b) can include comparing a cryptographic hash of the received password to a stored hash value to determine whether the received password is valid.

The method can also include:
(d) counting the number of invalid passwords received in a session; and in the event that the number of invalid passwords received is less than a predetermined number,
(e) enabling receipt of a further player password; and
(f) repeating steps (b) to (e).

In a further aspect the present invention provides a gaming apparatus configured to provide player access to one or more gaming apparatus features, said gaming apparatus including:
a display and a game controller arranged to control images displayed on the display,
a input interface to receive player inputs to the gaming apparatus features accessible from the gaming apparatus; and
a player authentication component configured to control access to at least one gaming apparatus feature by a player; said authentication component being configured to receive at least a player password entered by a player using a the input interface and defined using password elements selected from a set of elements including one or more images. The authentication component is preferably configured to enable access to said one or more gaming features in the event that a received password is valid.

Preferably the one or more images are game-related images associated with a gaming apparatus feature accessible from the gaming apparatus.

The set of elements can also include one or more characters. In a preferred embodiment the characters are selected from a character set including one or more of the following kinds of characters:
alphabetic characters;
numerals;
punctuation marks;
typographical symbols.

Preferably the game controller is configured to generate at least one gaming apparatus feature interface including one or more game-related images, and wherein said set of elements from which the password is defined, includes at least one of said game-related images.

The set of elements can include one or more icons representing a game-related image which forms part of said at least one gaming apparatus feature interface.

In a preferred embodiment the set of elements includes one or more images selected from at least one of the following classes of images:
images representing the rank and/or suit of playing cards,
images representing one or more symbols used on a reel of a spinning reel game accessible on the gaming apparatus;
images representing one or more symbols used in association with a game accessible via another gaming apparatus;
images representing animated characters;
images associated with a theme of the gaming apparatus.

The authentication component can further be configured to receive a player name. The player name can be received from the input interface. Alternatively the gaming apparatus can include a token reader and the player name can be received from the token reader.

In a preferred embodiment the authentication component can further be configured to determine whether the received password is valid.

The authentication component can also be configured to determine whether the received password corresponds to password associated with a received player name.

In a preferred embodiment the gaming apparatus includes a data storage means configured to store thereon a user database accessible by the authentication component. In this embodiment the authentication component can also be configured to compare a cryptographic hash of the received password to a hash value stored in the user database to determine whether the received password is valid.

In an alternative embodiment the authentication component can be configured to cooperate with an authentication server configure to determine whether a received password is valid.

In a preferred embodiment the input interface includes a touch-screen. In such an embodiment the game controller is configured to generate a password entry interface for display on the touch-screen, including a plurality of images representative of at least part of the set of elements and wherein each image is aligned with a respective touch-screen sensor, wherein in use the password entry interface allows a player to enter a password by touching selected ones of the displayed images of the interface.

The invention extends to a gaming apparatus system comprising at least one gaming apparatus and at least one server, said gaming apparatus and server being connected by a communication network and being configured to cooperate to provide player access to one or more gaming apparatus features via said gaming apparatus, said gaming apparatus including, a display and a game controller arranged to control images displayed on the display, a input interface to receive player inputs to the gaming apparatus features accessible from the gaming apparatus; said gaming apparatus system further including a player authentication subsystem configured to control access to at least one gaming apparatus feature by a player; said authentication subsystem being configured to receive at least a player password entered by a player using a the input interface and defined using password elements selected from a set of elements including one or more images.

Preferably the one or more images are game-related images associated with a gaming apparatus feature accessible from the gaming apparatus.

The set of elements can also include one or more characters. In a preferred embodiment the characters are selected from a character set including one or more of the following kinds of characters:
alphabetic characters;
numerals;
punctuation marks;
typographical symbols.

Preferably the game controller is configured to generate at least one gaming apparatus feature interface including one or more game-related images, and wherein said set of elements from which the password is defined, includes at least one of said game-related images.

The set of elements can include one or more icons representing a game-related image which forms part of said at least one gaming apparatus feature interface.

In a preferred embodiment the set of elements includes one or more images selected from at least one of the following classes of images:
images representing the rank and/or suit of playing cards,
images representing one or more symbols used on a reel of a spinning reel game accessible on the gaming apparatus;
images representing one or more symbols used in association with a game accessible via another gaming apparatus forming part of the gaming apparatus system;
images representing animated characters; images associated with a theme of the gaming apparatus.

The authentication subsystem can further be configured to receive a player name. The player name can be received from the input interface. Alternatively the gaming apparatus can include a token reader and the player name can be received from the token reader.

The authentication subsystem can also be configured to determine whether the received password corresponds to password associated with a received player name.

In a preferred embodiment the gaming apparatus system includes a data storage means configured to store thereon a user database accessible by the authentication component. In this embodiment the authentication subsystem can also be configured to compare a cryptographic hash of the received password to a hash value stored in the user database to determine whether the received password is valid.

In a preferred embodiment the authentication subsystem comprises a client side authentication component running on the gaming apparatus and a server side authentication component running remotely to the gaming apparatus that cooperate to control access to said at least one gaming apparatus feature.

In a preferred embodiment the input interface includes a touch-screen. In such an embodiment the game controller is configured to generate a password entry interface for display on the touch-screen, including a plurality of images representative of at least part of the set of elements and wherein each image is aligned with a respective touch-screen sensor, wherein in use the password entry interface allows a player to enter a password by touching selected ones of the displayed images of the interface.

In a fourth aspect the present invention provides a gaming apparatus interface configured to enable a user of a gaming apparatus to enter a password to gain access to at least one gaming apparatus feature, said password being defined using a set of elements including one or more images; wherein said interface includes a element display region configured to display plurality of elements comprising at least a subset of the set of elements for selection by the user.

Preferably the one or more images are game-related images associated with a gaming apparatus feature accessible from the gaming apparatus.

The set of elements can also include one or more characters. In a preferred embodiment the characters are selected from a character set including one or more of the following kinds of characters:
alphabetic characters;
numerals;
punctuation marks;
typographical symbols.

Preferably the subset of elements are displayed in the element display region are arranged in an array.

The interface can also include a password display region configured to display at least a representation of a number of elements selected by a user when entering a password. In some embodiments the password display region configured is configured to display the elements selected by a user when entering a password. In an alternative embodiment a place marking character may be displayed in the password display region to represent each element selected by a user when entering a password.

In this specification, where reference is made to gaming apparatus reels, spinning of such reels, symbols appearing on the reels, playing cards, and the like, this is to be taken as including simulated versions thereof.

BRIEF DESCRIPTION OF THE DRAWINGS

Further aspects of the present invention will become apparent from the following description, given by way of example only and with reference to the accompanying drawings. In the drawings.

DESCRIPTION OF THE INVENTION

Figure 1:
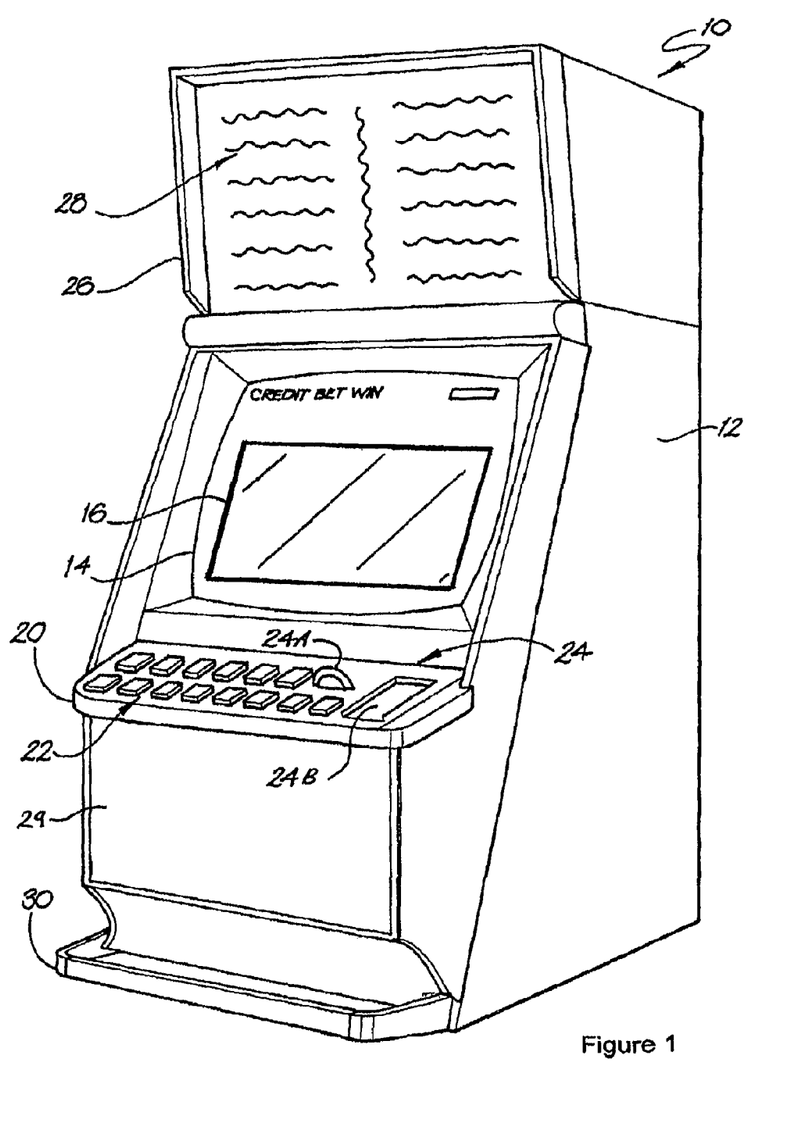
FIG. 1 shows diagrammatically, a view of a gaming apparatus suitable for implementing the present invention.

In FIG. 1 of the accompanying drawings, one example of a gaming machine suitable for implementing the present invention is generally referenced by arrow 10.

The gaming machine 10 includes a console 12 having a display 14 on which is displayed representations of a game 16, that can be played by a player. A mid-trim 20 of the gaming machine 10 houses a bank of buttons 22 for enabling a player to play the game 16. The mid-trim 20 also houses a credit input mechanism 24 including a coin input chute 24A and a bill collector 24B. A top box 26 may carry artwork 28, including for example, pay tables and details of bonus awards and other information or images relating to the game. Further artwork and/or information may be provided on the front panel 29 of the console 12. A coin tray 30 is mounted beneath the console 12 for cash payouts from the gaming machine 10.

The display 14 shown in FIG. 1 is in the form of a video display unit, particularly a cathode ray tube screen device. Alternatively, the display 14 may be a liquid crystal display, plasma screen, any other suitable video display unit, or the visible portion of an electromechanical device. In a preferred form the display 14 is a touch-screen configured to act as an input device for the gaming machine 10. The top box 26 may also include a display, for example a video display unit, which may be of the same type as the display 14, or a different type of display.

Figure 2:
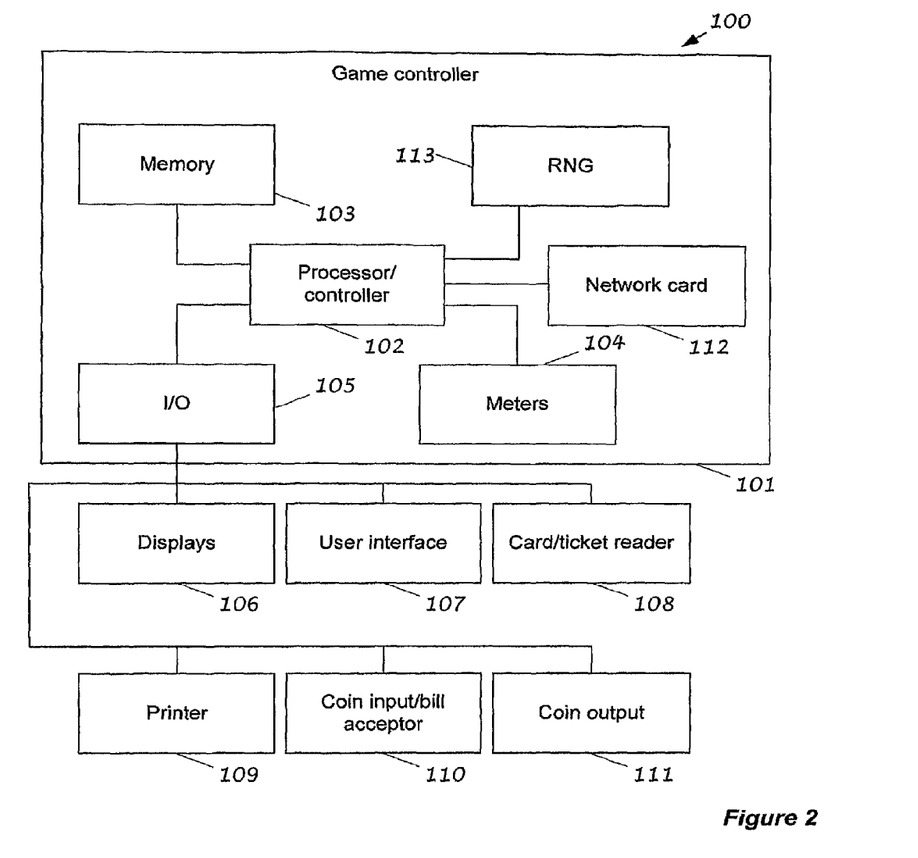
FIG. 2 shows a block diagram of gaming apparatus suitable for implementing the present invention.

FIG. 2 shows a block diagram of a gaming apparatus, generally referenced by arrow 100, suitable for implementing the present invention. The gaming machine 100 may, for example, operate as a standalone gaming machine of the type shown in FIG. 1. However, the gaming machine 100 may alternatively operate as a networked gaming machine, communicating with other network devices, such as one or more servers or other gaming machines. The gaming machine 100 may also have distributed hardware and software components that communicate with each other directly or through a network. Accordingly, different reference numerals have been used in FIG. 2 from FIG. 1 for components that may be equivalent.

The gaming machine 100 includes a game controller 101, which in the illustrated example includes a microprocessor, microcontroller, programmable logic device or other computational device 102. Instructions and data to control operation of the computational device 102 are stored in a memory 103, which is in data communication with the computational device 102. Typically, the gaming machine 100 will include both volatile and non-volatile memory and more than one of each type of memory, with such memories being collectively represented by the memory 103. The instructions to cause the game controller 101 to implement the present invention will be stored in the memory 103.

The gaming apparatus may include hardware meters 104 for the purposes of regulatory compliance and also include an input/output (I/O) interface 105 for communicating with the peripheral devices of the gaming machine 100. The input/output interface 105 and/or the peripheral devices may be intelligent devices with their own memory for instructions and data.

In the example shown in FIG. 2, the peripheral devices that communicate with the controller are one or more displays 106, user interfaces 107, a card and/or ticket reader 108, a printer 109, a bill acceptor and/or coin input mechanism 110 and a coin output mechanism 111. One or more of the displays 106 may include a touch screen 106A, forming part of the user interface 107. Additional devices may be included as part of the gaming machine 100, or devices omitted as required for the specific implementation.

In a preferred form the card/ticket reader peripheral 108 is used by a player tracking service to enable a player to identify themselves to the gaming apparatus (or a related system to which it is connected) as part of a login procedure.

In addition, the gaming machine 100 may include a communications interface, for example a network card 112. The network card, may for example, send status information, accounting information or other information to a central controller, server or database and receive data or commands from a the central controller, server or database. As explained in more detail in relation to FIG. 4, the computational device 102 may include two or more controllers or processors, which may be local or remote from each other and the displays 106.

Figure 3:
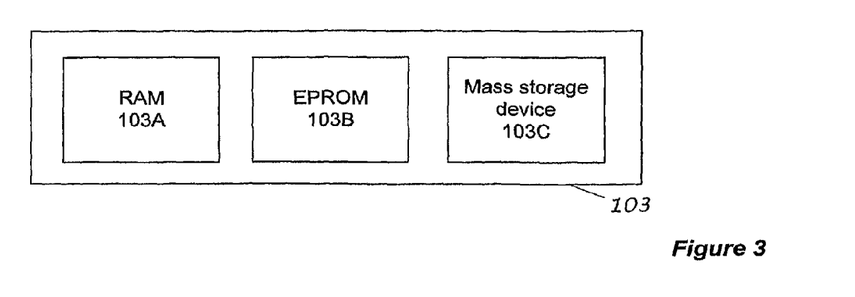
FIG. 3 shows a block diagram of components of the memory of the gaming apparatus represented in FIG. 2.

FIG. 3 shows an exemplary block diagram of the main components of the memory 103. The RAM 103A typically temporarily holds program files for execution by the computational controller 102 and related data. The EPROM 103B may hold be a boot ROM device and/or may contain some system or game related code. The mass storage device 103C is typically used to store game programs, the integrity of which may be verified and/or authenticated by the computational controller 102 using protected code from the EPROM 103B or elsewhere.

Figure 4:
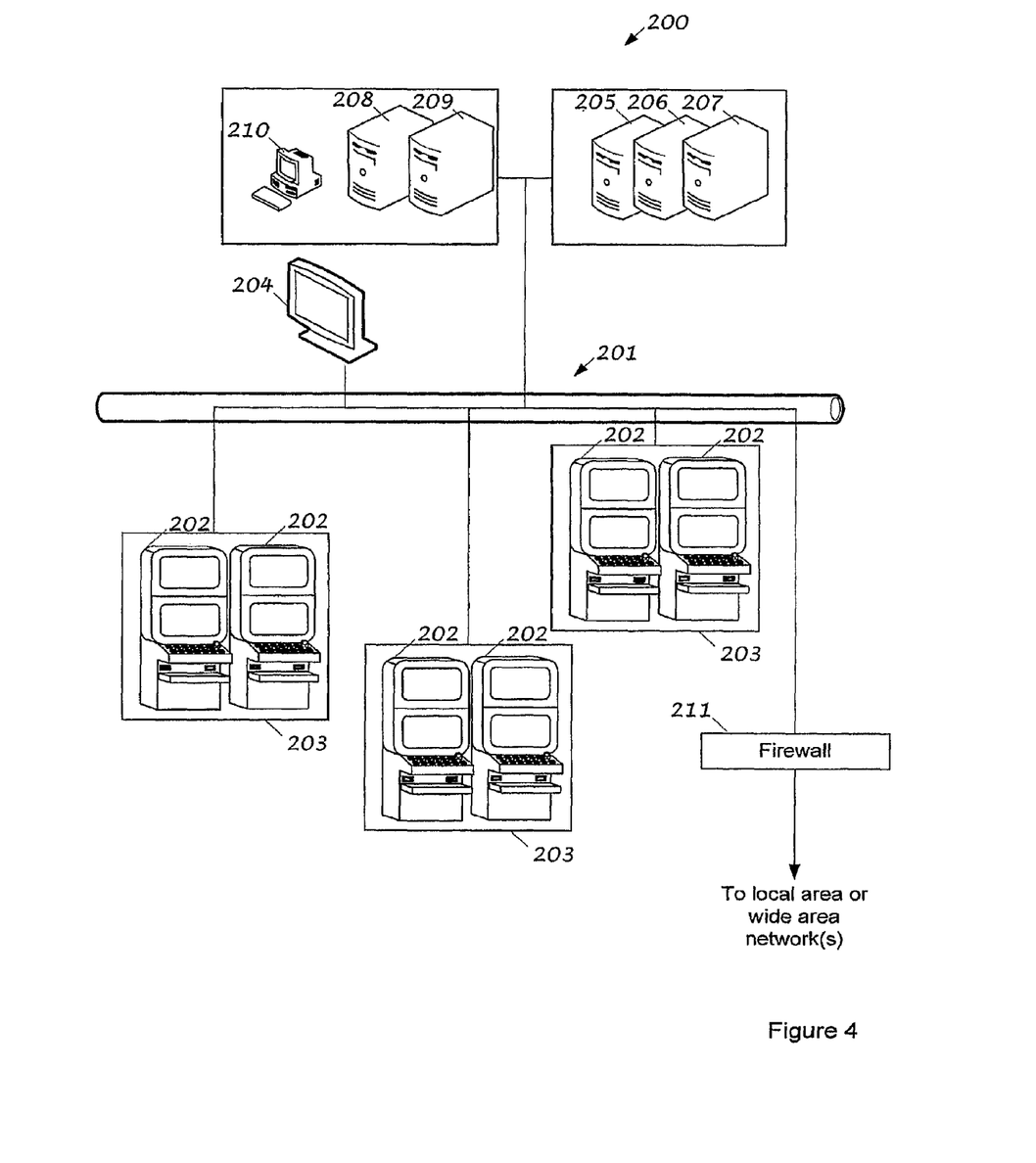
FIG. 4 shows diagrammatically, a network gaming system suitable for implementing the present invention.

FIG. 4 shows a gaming system 200. The gaming system 200 includes a network 201, which for example may be an Ethernet network. Gaming devices 202, shown arranged in three banks 203 of two gaming devices 202 in FIG. 4, are connected to the network 201. The gaming devices 202 may be gaming machines 10, as shown in FIG. 1 or form part or all of another gaming machine 100. Single gaming devices 202 and banks 203 containing three or more gaming devices 202 may also be connected to the network 201.

One or more displays 204 may also be connected to the network 201. The displays 204 may, for example, be associated with a bank 203 of gaming devices. The displays 204 may be used to display representations associated with game play on the gaming devices 202, and/or used to display other representations, for example promotional or informational material.

Servers may also be connected to the network 201. For example, a game server 205 may generate game outcomes for games played on the gaming devices 202, a database management server 206 may manage the storage of game programs and associated data for downloading or access by the gaming devices 202 in a database 206A, and a jackpot server may control one or more jackpots associated with the gaming devices 202. A player tracking server 207 may track player statistics and game usage eg. for use in the delivery of promotions etc. to players. The tracking server 207 can cooperate with player tracking peripherals forming part of the gaming devices 203 to allow a player to log into the player tracking system.

Further servers may be provided to assist in the administration of the gaming system 200, including for example a gaming floor management server 208, and a licensing server 209 to monitor the use of licenses to particular games. An administrator terminal 210 is provided to allow an administrator to run the network 201 and the devices connected to the network.

The gaming system 200 may communicate with other gaming systems, other local networks, for example a corporate network and/or a wide area network such as the Internet through a firewall 211.

In the preferred embodiment, the gaming machine 10 of FIG. 1 is configured such that a player may be required to "login" to the machine (or network) by entering a user name and password in order to be allowed access certain features of the game or gaming machine 10. Typically the login process requires the player to enter a user name and corresponding password as described below, although in some embodiments only a password will need to be entered.

In order to implement the login procedure the game controller 101 or a dedicated peripheral device operates under the control of a set instructions, to behave as an authentication component, which controls the login procedure and/or performs authentication of passwords or user names entered.

In the preferred embodiment the authentication component is configured to allow a user's password to be defined using a set of elements including a plurality of images, e.g. symbols or pictures. Preferably the set of elements includes at one or more characters. The characters can be alphabetic characters, numerals, punctuation marks and/or other typographical symbols. The user's password is entered using either, or both of the keypad 22 and a plurality of touch-screen sensors associated with display 14. Preferably, the pictures or symbols able to be used by a player for his or her password include at least some of those which are used in the game or games played on the gaming machine 10.

Figure 5:
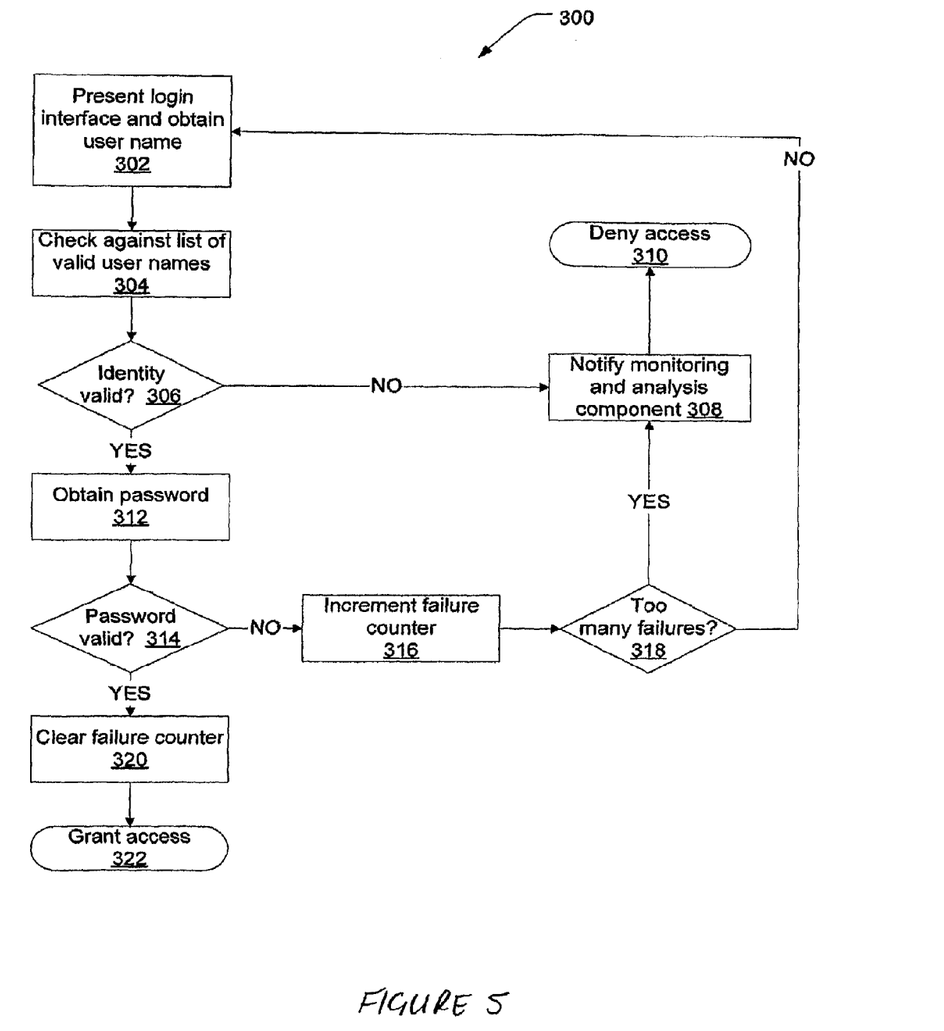
FIG. 5 is a flowchart depicting a process for granting access to a game feature according to an embodiment of the present invention.

A log-in process in which a player enters a user name and password is described with reference to the flow diagram 300 of FIG. 5. In order to deter unauthorised users from guessing another player's password a player is provided with a limited number of attempts to enter the correct password before triggering an alert condition. To initiate the log-in procedure 300 the player, at block 302, is presented with a login interface on the display 14, which invites the player to enter a user name. The user name may be entered by way of a token which is inserted in a token acceptor eg. card reader or player tracking peripheral, connected to the machine 10 eg. a contact or contactless smartcard reader, RFID token reader, magnetic stripe card reader or the like (not shown), or by the player entering his name using key pad 22 (where provided) and/or touch-screen sensors of the gaming machine 10.

Next in step 304, the authentication component accesses a list of valid user names (identifiers) stored in a database structure in memory 103 and compares the user name with a stored list of valid user names, to determine if the purported user name is valid at step 306.

If the user name is not on the stored list, it is identified as being invalid, and the authentication component sends a message in step 308 to an analysis and monitoring component (not shown) of the gaming machine 10 or system to notify it of the attempt to enter an invalid user name. In this event the authentication component denies the player access to the requested game feature or game, as represented at step 310.

If the user name is on the stored list, it is identified as being valid, and the authentication component then gathers the user's password at step 312. Typically the game controller will generate a password entry interface for display on display 14. The interface invites the player, by way of an appropriate message, to enter a password.

The authentication component is configured to allow the use of images e.g. symbols or pictures to define a password. Optionally the authentication component can additionally allow one or more characters to be used to define a password. The characters can be selected from a known character set such as the ASCII character set or the like. The user's password is entered using either, or both of the keypad 22 and a touch-screen interface. Preferably, the pictures or symbols able to be used by a player for his or her password include at least some of those which are used in the game or games played on the gaming machine 10.

The authentication component creates a hash of the password using a predetermined hashing algorithm; then in step 314 compares the hash of the received password with a stored password hash associated with the relevant user name to determine whether the entered password is valid.

If the purported password does not correspond to the stored password associated with the particular user name, then the authentication component identifies the password as being invalid and increments a counter, as represented by the block 316, to track the number of failed attempts by the player to enter the valid password. In this manner, the authentication component can determine, as represented by the block 318, if there have been more failed attempts than permitted by the system. If there have been too many failed attempts, then the authentication component notifies the analysis and monitoring component (referred to above) of the fact of the excessive attempts, as represented by the block 308, and denies the player access to the gaming apparatus feature as represented by the block 310.

On the other hand, if there has not been an excessive number of attempts, the authentication component allows the player to attempt, again, to enter the valid password as represented by the block 302.

If the password entered is correct, then, in block 320, the authentication component 40 clears the recorded number of unsuccessful attempts by the player to enter the valid password, and then grants the player access to the requested gaming apparatus feature as represented by the block 322.

As will be appreciated, players who do not have an existing password will need to go through an account establishment process which is used to establish a user record, or account accessible by the machine 10. When a password is first defined by a player, the password is transmitted to authenticating module which creates a cryptographic hash of the password and stores the hash in a database stored in the memory 103. The system preferably does not store the password itself as entered by the player.

According to the preferred embodiment the player may select, as components of his desired password, or as the whole password, images or pictures that are displayed on the display 14 of the gaming machine 10.

In the illustrative embodiment, the gaming machine 10 is adapted to simulate the effect of spinning reels during gameplay. The gaming machine 10 is configured such that the reel images include game symbols comprising the images representing playing cards, i.e. playing cards with the ranks of 2 to 10, as well as jacks, queens, kings, aces, and jokers, in each of the suits of cards, being clubs, diamonds, hearts and spades. The reels may also display certain "wild" or "scatter" symbols that may be designed in keeping with a theme or character associated with the gaming apparatus. Preferably one or all of these "game symbols" are available for players to use as part or all of their passwords.

Figure 7:
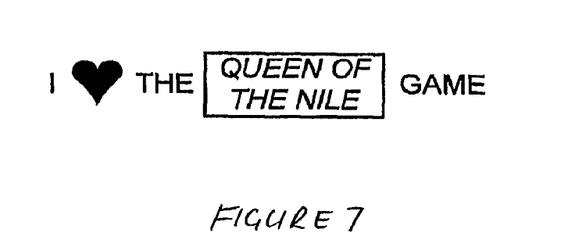
FIG. 7 is a representation of a password string defined using an embodiment of the present invention.

For example, if the name of the gaming machine 10 is the "Queen of the Nile", then this name may also be represented by an image of an Egyptian queen which the player may select as part of his or her password. Other Egyptian themed images can also be used. Advantageously, this embodiment encourages a player to use a password which is a sentence in which the themed image such as the "Queen of the Nile" constitutes a phrase. Thus, for example, the player may choose his or her password to be "I LOVE THE QUEEN OF THE NILE GAME". In an embodiment of the present invention the player can select the string of letters and images 88 appearing in FIG. 7 to represent this password. In this password string 88, the letter "I", and the words "THE" and "GAME" are made up by selecting traditional alphabetic characters from the set of elements, while the heart symbol and "Queen of the Nile" parts of the password are constituted by symbols available on the gaming machine 10.

In an embodiment where the gaming machine 10 is one which relates to a simulated card game, then the heart symbol may be constituted by an image of a heart as used to denote the suit of "hearts". Passwords forming sentences such as the present example may be relatively easy for a player to remember due to the meaning attached to them, but are also difficult to guess or replicate by brute force due to their long length and additional set of symbol- or image-based variables.

As will be appreciated, a wide range of game-related symbols could be included in the set of elements from which a password can be defined. In one preferred embodiment, the images that are made available for a player to select as part of a password include symbols and images used by other gaming apparatus such as machines 202, 203 of FIG. 4 which are connected to the same gaming apparatus network 200 as the machine 10.

When a player wishes to enter a password, the player may select, as the individual elements of the password, one or more symbols from the game played on the gaming machine 10. The gaming machine 10 is configured such that these symbols are displayed on an interface in an array in the touch-screen portion of the display 14. In a preferred embodiment, the symbols able to be selected by a player also include conventional alphanumeric characters and symbols forming the whole or part of the ASCII character set.

Figure 6:
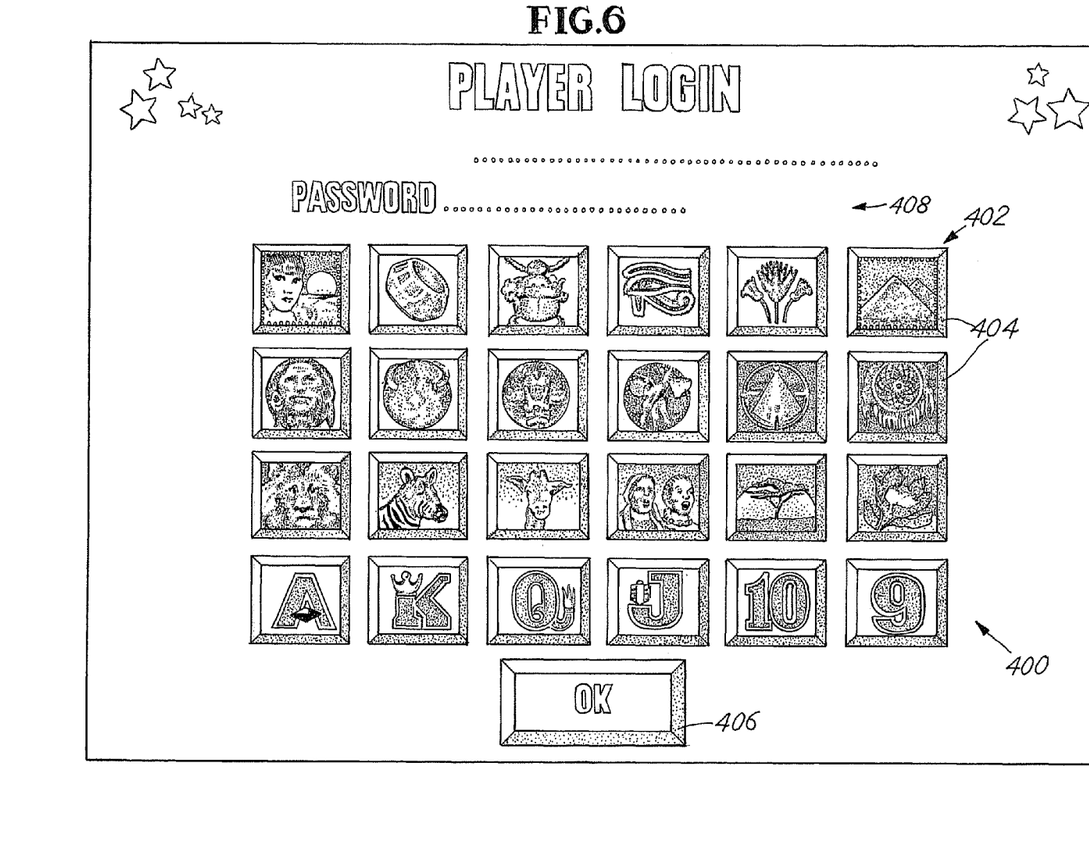
FIG. 6 depicts a password entry interface according to an embodiment of the present invention.

Each symbol presented in the interface is aligned with a corresponding touch-screen sensor which the player can select by pressing the area of the screen in which the symbol appears. In FIG. 6, an example of a password entry interface 400 including an array, designated 402, of selectable symbols 404. The interface also includes an "OK" symbol 406 which the player can select to confirm the password once the player is satisfied that he or she has entered it correctly. The interface 400 also includes, a password display area 408. In the present embodiment, the interface 400 has no input echo, instead a place marking character such as an asterisk may appear in the area 408 for each symbol 404 selected by the player, to indicate that a symbol has been selected. In an embodiment where there is an input echo, a representation of each symbol 404 selected will appear.

An advantage of the preferred embodiment of the present invention is that the symbols that are available for use on the particular gaming machine 10 or system 2 may be more easily remembered as parts of passwords than purely alphanumeric characters traditionally used for passwords. This advantage can be realised because of the visual impression created by the images and also, in certain instances, because the images can be combined in a password string to relate a story, concept, sequence of events, in a player's mind, as reflected by the string 88 shown in FIG. 7.

In a gaming environment, a player may remember game-playing events that make particular impression on him, such as a significant win. Accordingly, the ability to select, as parts of a password, symbols which formed part of a winning combination in a significant win may be desirable. Indeed, according to one embodiment of the invention, the system is adapted to store symbols or combinations of symbols relating to significant wins and symbols reflecting prize values. For example, if a player achieves a win of $100 based on a symbol combination consisting of three "pyramid" symbols and two "queen" symbols, the player can choose as his password symbols representing $100, and one or more symbols representing or making up the combination of symbols defining the win. The machine 10 may even be configured to automatically store the amount of the win and some or all of the winning symbols as a password or part of a password. Symbols representing entire hands of cards e.g. a royal flush can also be utilized in embodiments of the present invention.

In addition to aiding recollection of passwords and potentially encouraging the use of longer passwords, certain embodiments may also permit the use of a far greater range of passwords. Traditionally, approximately 95 different ASCII characters are available for use in passwords. Accordingly, if a password includes a string of eight characters, then the number of possible passwords would be $95^8$. However, it will be appreciated that a conventional deck of cards including jokers, has 54 different cards. Therefore, if the images provided on a particular gaming apparatus or system, for use as elements of a password, include representations of the 54 cards of a deck in addition to the aforementioned 95 ASCII characters, then the total number of characters is 149. Thus, the number of possible password variations in this case is $149^8$.

Figure 8:
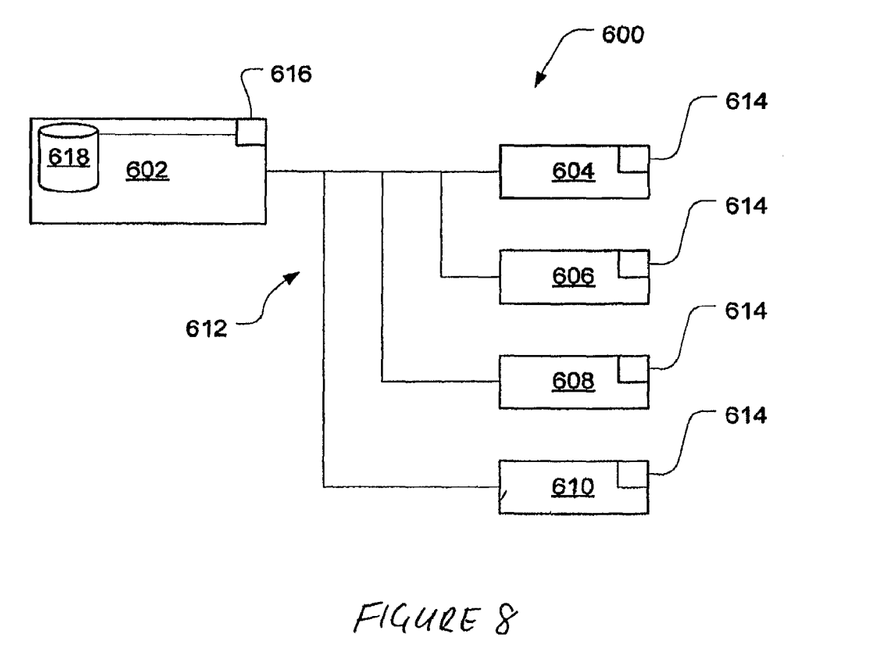
FIG. 8 depicts a gaming system network according to an embodiment of the present invention.

FIG. 8 depicts an alternative embodiment of the present invention in which a plurality of gaming apparatuses are connected to a game server via a gaming network. The network 600 comprises a central game server 602 which is configured to determine the outcome of games played on a plurality of gaming apparatuses 604, 606, 608, 610. The gaming apparatus 604 to 610 is substantially the same as the gaming apparatus described in connection with FIG. 1 and are each connected to the gaming server via data communication network 612. The network 600 includes an authentication subsystem which controls player access as described above. In this regard each gaming apparatus includes a client side authentication component 614, which is typically implemented in software and which may include a token reader, which cooperates with a server side authentication component 616 which forms part of the game server 602. The server side authentication component 616 can additionally be coupled to a user database 618 or other database storing user information such as financial account data and the like. As will be appreciated by those skilled in the art, a method of the type described above in connection with FIG. 5 can be used to identify and authenticate a user with only slight variation. In this regard, the client side authentication component 614 of a gaming apparatus e.g. 604 will control the client side functions of the authentication process such as prompting a user to enter his or her user name and/or password and creating cryptographic hash of the data entered. The server authentication component 616 performs the server side functions of the method including checking the validity of user names against the records stored in the user database 618 (if applicable) and comparing the cryptographic hash value of a password sent via the client side authentication component 614 to the hash value stored in the user database 618.

In certain embodiments it may be advantageous for individual gaming apparatuses (or groups of gaming apparatuses) to encode the set of elements available to its users for defining a password in a different manner to other gaming apparatuses (or groups of gaming apparatuses). For example, although the image of a "King" selectable by a player of gaming apparatus 604 for inclusion in a password may be identical in appearance to the "King" selectable by a player of gaming apparatus 606, these "Kings" can each be assigned a different character value, that is they can be considered as different characters for the purpose of defining passwords.

In certain embodiments a player (e.g. of apparatus 604) can be allowed to define his or her password using the set of available characters primarily defined for use with another apparatus (e.g. apparatus 606). In such an example the player might be able to choose 2 types of identical looking "Kings" for use in his or her password, one king being encoded as per gaming apparatus 604 and the other being encoded as per gaming apparatus 606. Advantageously during the entry of his or her password, a player can use the gaming apparatus interface to alternate between display screens showing the character sets encoded for the different apparatuses. Alternatively a plurality character sets corresponding to different gaming apparatuses (or groups of apparatuses) can be simultaneously displayed.

Such an embodiment can be advantageous as it may allow the characters and images making up a password to be viewed by a third party without entirely revealing the actual password.

Those skilled in the art will appreciate that there are many variations on the client-server model which can be employed to implement authentication process in accordance with an embodiment of the present invention, and accordingly that the client-server embodiment described herein is given merely by way of example and the present invention should not be considered limited to this embodiment.

In alternative embodiments a stand-alone authentication server could be used in place of the server side authenticating component 616.

As will be appreciated the authentication methods described above in connection with the illustrative embodiments, and variations thereof, can be used to verify user's identity for a range of activities in connection with the use of a gaming apparatus or gaming apparatus network. The following list sets out a non-exhaustive set of exemplary situations in which a players identity could be required or requested. A player may be asked to enter a password (with or without a username):

to begin playing a game;
    to lock a apparatus for short periods using, and to subsequently unlock the apparatus;
    to take advantage of a royalty program of which the player is a member;
    to identify themselves in order to gain access to money, credits or complementary games stored in a player account, held by the gaming establishment, financial institution or the like;
    to take part in cooperative or team games;
    to have a set of preferences loaded in the apparatus in order to tailor the operation or interface of the apparatus to their liking;
    to resume a previous game at a particular point.

Other reasons for needing to identify and/or authenticate a player of a gaming apparatus will be readily apparent to those skilled in the art.

While the foregoing description has been provided by way of example of the preferred embodiments of the present invention as presently contemplated, which utilise gaming apparatus and machines, those skilled in the relevant arts will appreciate that the present invention also may have application to internet gaming and/or have application to gaming over a telecommunications network, where handsets are used to display game outcomes and receive player inputs.

Where in the foregoing description reference has been made to integers having known equivalents, then those equivalents are hereby incorporated herein as if individually set forth.

Those skilled in the relevant arts will appreciate that modifications and additions to the embodiments of the present invention may be made without departing from the scope of the present invention.

It will be understood that the invention disclosed and defined in this specification extends to all alternative combinations of two or more of the individual features mentioned or evident from the text or drawings. All of these different combinations constitute various alternative aspects of the invention.

It will also be understood that the term "comprises" (or its grammatical variants) as used in this specification is equivalent to the term "includes" and should not be taken as excluding the presence of other elements or features.

The invention claimed is:

1. A method of providing a player with access to a gaming feature of a gaming apparatus in a gaming system, wherein the gaming feature is associated with a game of chance, the method comprising:
    obtaining player identity information from a token to identify the player requesting access to the gaming feature;
    checking the player identity information against stored player identity information corresponding to a plurality of players authorized to access one or both the gaming feature or the gaming apparatus;
    inhibiting access to one or both the gaming feature or gaming apparatus if the player identity information does not authorize access to one or both the gaming feature or the gaming apparatus;
    if the player identity information authorizes access to the gaming feature and the gaming apparatus, receiving a player password entered through a player interface at the gaming apparatus, wherein the player password comprises at least one image corresponding to one or both the gaming feature or a game available at the gaming apparatus;
    checking the received player password against a predefined player password associated with the received player identity information; and
    providing player access to the gaming feature at the gaming apparatus if the received player password and the predefined player password correspond with one another.

2. The method of claim 1, wherein the player password further comprises at least one alphanumeric character selected from a group comprising an alphabetic character, a numeral, a punctuation mark, and a typographical symbol.

3. The method of claim 1, further comprising displaying one or both an icon corresponding to the gaming feature or a game available at the gaming apparatus, wherein the icon is displayed on an interface of the gaming apparatus, and wherein the at least one image comprises the icon.

4. The method of claim 1, wherein the at least one image comprises one or more of the following image types:
    an image representing a rank and a suit of a playing card;
    an image representing a symbol used on a reel of a spinning reel game accessible on the gaming apparatus;
    an image representing a symbol used in association with a gaming feature accessible from another gaming apparatus;
    an image representing an animated character;
    an image associated with a theme of the gaming apparatus; or
    an image associated with a theme of the gaming feature.

5. The method of claim 1, wherein the player identity information includes a player name.

6. The method of claim 1, further comprising defining the predefined player password associated with the player identity information of a player at an interface of the gaming apparatus.

7. The method of claim 1, wherein the gaming feature comprises a player wager account, and wherein the method further comprises providing access to the player wager account associated with the player identity information if the received player password and the predefined player password correspond with one another.

8. The method of claim 1, wherein checking the received player password against the predefined player password associated with the received player identity information comprises comparing a cryptographic hash value of the received player password to a stored cryptographic hash value of the predefined player password.

9. The method of claim 1, further comprising:
    counting a number of times the received player password fails to correspond with the predefined player password associated with the player identity information during a gaming session;
    continuing to receive another player password if the counted number is less than a predetermined number; and
    discontinuing reception of further player passwords during the session once the counted number is greater than the predetermined number.

10. A gaming system comprising:
    a gaming apparatus comprising:
        a display;
        a game controller configured to control images displayed on the display;
        a player interface configured to receive information associated with accessing a gaming feature, wherein the game feature is associated with a game of chance playable at the gaming apparatus, the player interface configured to allow entry of a player password having either or both an image corresponding to the gaming feature or an image corresponding to a game available at the gaming apparatus;
        a token reader configured to obtain player identity information from a token to identify a player requesting access to the gaming feature;
    a player authentication component configured to receive the player password entered at the player interface and the player identity information provided by the token, wherein the player authentication component is configured to:
        check the player identity information against stored player identity information corresponding to a plurality of players authorized to access one or both the gaming feature or the gaming apparatus;
        inhibit access to one or both the gaming feature or gaming apparatus if the player identity information does not authorize access one or both the gaming feature or gaming apparatus;
        check the received player password against a predefined password associated with the player identity information provided by the token;
        if the check of the player identity information against the predefined password associated with the player identity information does not authorize access to one or both the gaming feature or the gaming apparatus, inhibiting access to one or both the gaming feature or gaming apparatus; and
        provide player access to the gaming feature if the received player password and the predefined password correspond with one another.

11. The gaming system of claim 10, wherein the player password comprises at least one alphanumeric character selected from a group comprising an alphabetic character, a numeral, a punctuation mark, and a typographical symbol.

12. The gaming system of claim 10, wherein the game controller is configured to display, on the display, an icon corresponding to one or both the gaming feature or a game available at the gaming apparatus, wherein the at least one image comprises the icon.

13. The gaming system of claim 10, wherein the at least one image comprises one or more of the following image types:
   an image representing a rank and a suit of a playing card;
   an image representing a symbol used on a reel of a spinning reel game accessible on the gaming apparatus;
   an image representing a symbol used in association with a gaming feature accessible from another gaming apparatus;
   an image representing an animated character;
   an image associated with a theme of the gaming apparatus; or
   an image associated with a theme of the gaming feature.

14. The gaming system of claim 10, wherein the player identity information includes a player name.

15. The gaming system of claim 10, wherein the player authentication component is further configured to establish a correspondence between a predefined password and player identity information at the interface of the gaming apparatus.

16. The gaming system of claim 10, wherein the player authentication component is further configured to compare a cryptographic hash value of the received player password to a stored cryptographic hash value of the predefined password.

17. The gaming system of claim 10, wherein the player authentication component is further configured to:
   count a number of times the received player password fails to correspond with the predefined password associated during a gaming session;
   continuing to receive an another player password if the counted number is less than a predetermined number; and
   inhibiting reception of further player passwords during the session once the counted number is greater than the predetermined number.

18. A method of providing a player with access to a gaming feature of a gaming apparatus in a gaming system, wherein the gaming feature is associated with a game of chance, the method comprising:
   obtaining player identity information from a token to identify the player requesting access to the gaming feature;
   checking the player identity information against stored player identity information corresponding to a plurality of players authorized to access the gaming feature;
   inhibiting access to the gaming feature if the player identity information does not authorize access to the gaming feature;
   if the player identity information authorizes access to the gaming feature, receiving a player password entered through a player interface at the gaming apparatus, wherein the player password comprises at least one image corresponding to a game available at the gaming apparatus;
   checking the received player password against a predefined player password associated with the received player identity information; and
   providing player access to the gaming feature at the gaming apparatus if the received player password and the predefined player password correspond with one another.

* * * * *